United States Patent [19]

Frei et al.

[11] Patent Number: 5,653,346
[45] Date of Patent: Aug. 5, 1997

[54] PROCESS AND DEVICE FOR SIFTING, SORTING, SCREENING, FILTERING OR SIZING SUBSTANCES

[75] Inventors: Karl Frei; Jürgen Solenthaler, both of Wil, Switzerland

[73] Assignee: Telsonic AG, Switzerland

[21] Appl. No.: 374,664

[22] PCT Filed: May 25, 1994

[86] PCT No.: PCT/EP94/01699

§ 371 Date: Mar. 6, 1995

§ 102(e) Date: Mar. 6, 1995

[87] PCT Pub. No.: WO94/27748

PCT Pub. Date: Dec. 8, 1994

[30] Foreign Application Priority Data

May 26, 1993 [DE] Germany ............... 43 17 525.2

[51] Int. Cl.$^6$ ..................................... B07B 1/42
[52] U.S. Cl. ................. 209/254; 209/365.1; 310/325
[58] Field of Search ........................ 209/364, 368, 209/365.1, 346, 254; 310/325

[56] References Cited

U.S. PATENT DOCUMENTS

| | | | |
|---|---|---|---|
| 2,784,842 | 3/1957 | Cover | 209/254 |
| 4,613,432 | 9/1986 | Racine et al. | 209/254 |
| 4,650,409 | 3/1987 | Nistri et al. | 209/388 X |
| 4,816,144 | 3/1989 | Monteith | 209/364 |
| 5,143,222 | 9/1992 | Monteith | 209/364 |
| 5,376,858 | 12/1994 | Imabayashi et al. | 310/325 X |
| 5,386,169 | 1/1995 | Dubruque | 209/365.1 X |
| 5,398,816 | 3/1995 | Senapati | 209/364 |
| 5,431,287 | 7/1995 | Knox | 209/254 X |

FOREIGN PATENT DOCUMENTS

| | | |
|---|---|---|
| 0369572 | 5/1990 | European Pat. Off. . |
| 3602351 | 12/1986 | Germany . |

*Primary Examiner*—D. Glenn Dayoan
*Attorney, Agent, or Firm*—Bachman & LaPointe, P.C.

[57] ABSTRACT

In an apparatus for sieving, grading, sifting, filtering or sorting dry solid substances or solid substances in liquids having a sieve surface provided in a sieve frame and an ultrasound transducer (10) which is associated with the sieve surface (18) and by which oscillations can be fed to the sieve surface, associated with the ultrasound transducer (10) is at least one resonator (14) which bears against the sieve surface (18) and which is tuned to the resonance of the ultrasound transducer and which can be caused to oscillate thereby, in particular with flexural oscillations. The resonator (14) which in an embodiment is disposed in the center of the sieve surface (18) is to be provided with resonance-transmitting elements (16) which project finger-like from the resonator on the sieve surface (18) and which project radially from same in the form of bar resonators.

33 Claims, 10 Drawing Sheets

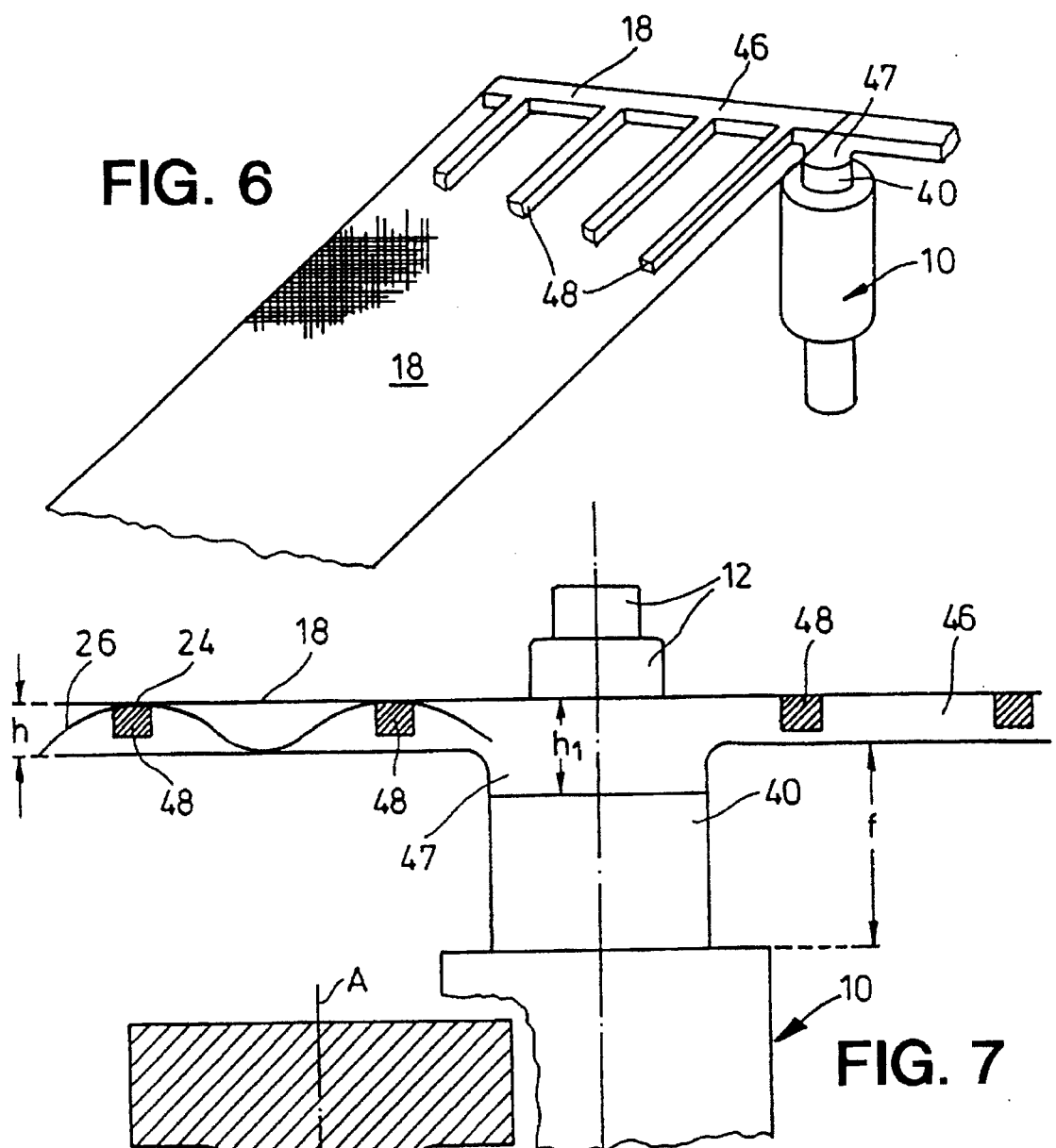
FIG. 6
FIG. 7
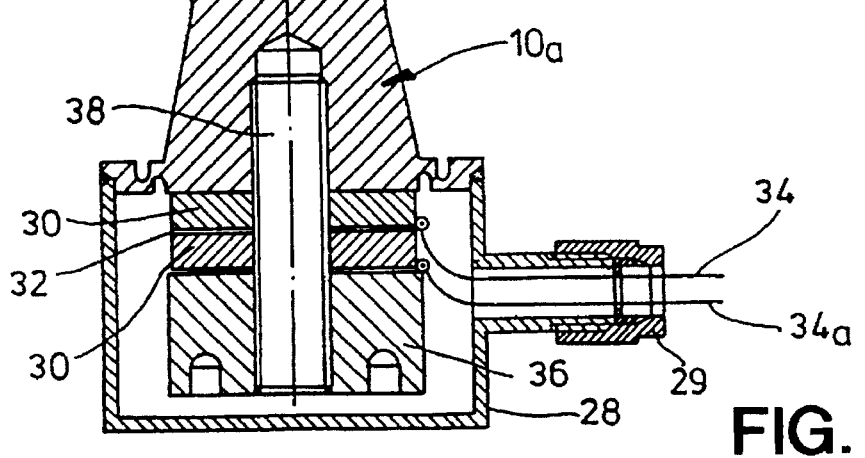
FIG. 8

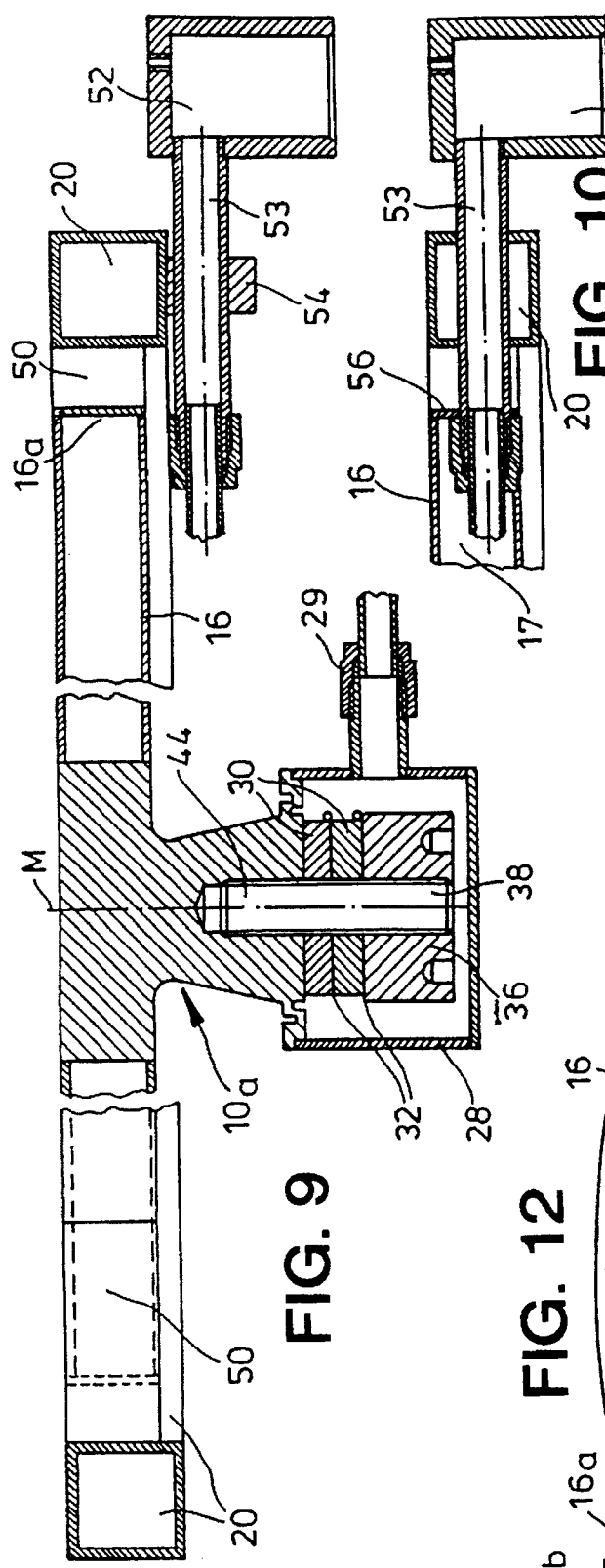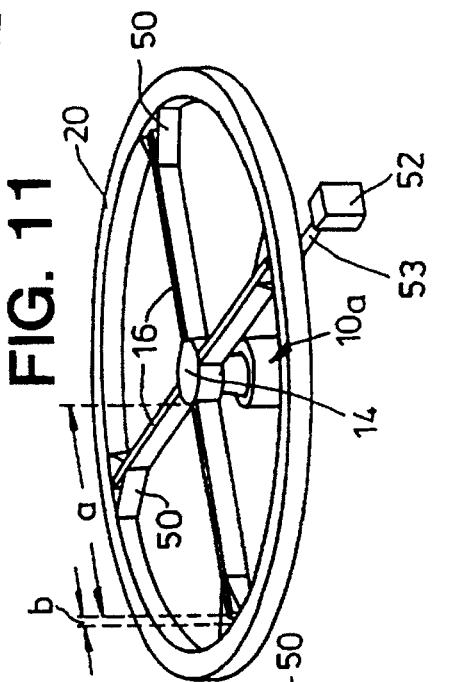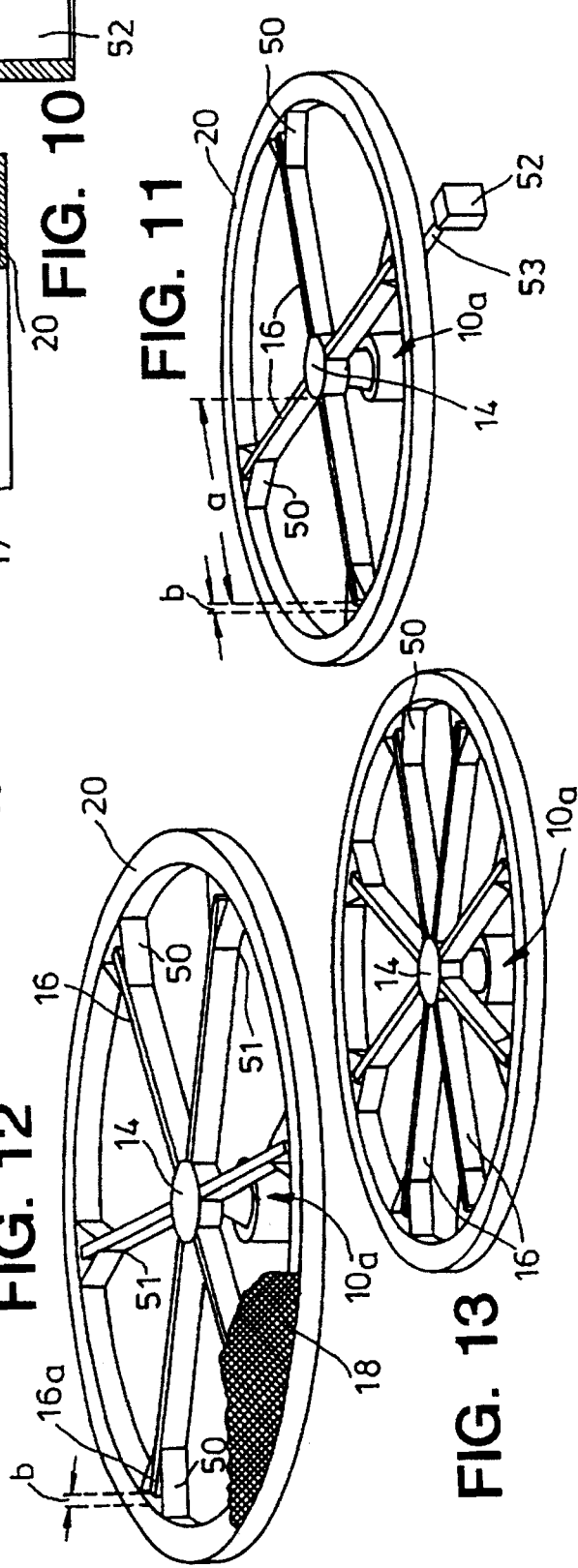

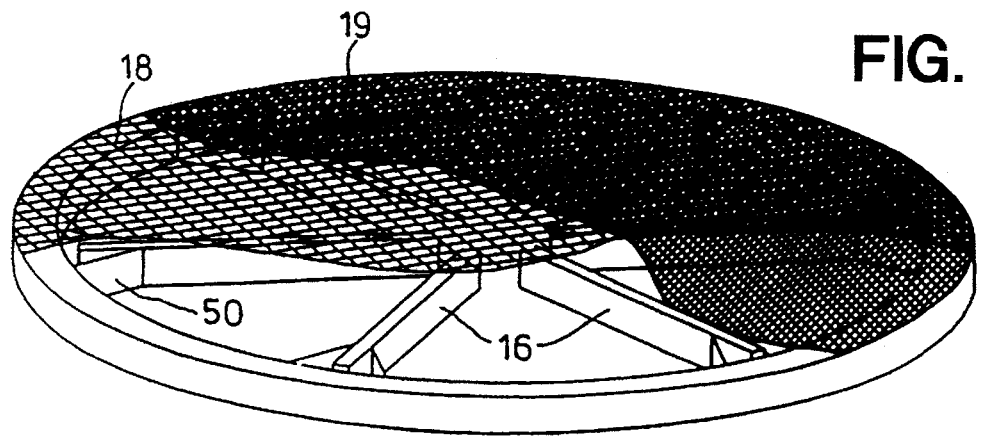
FIG. 14
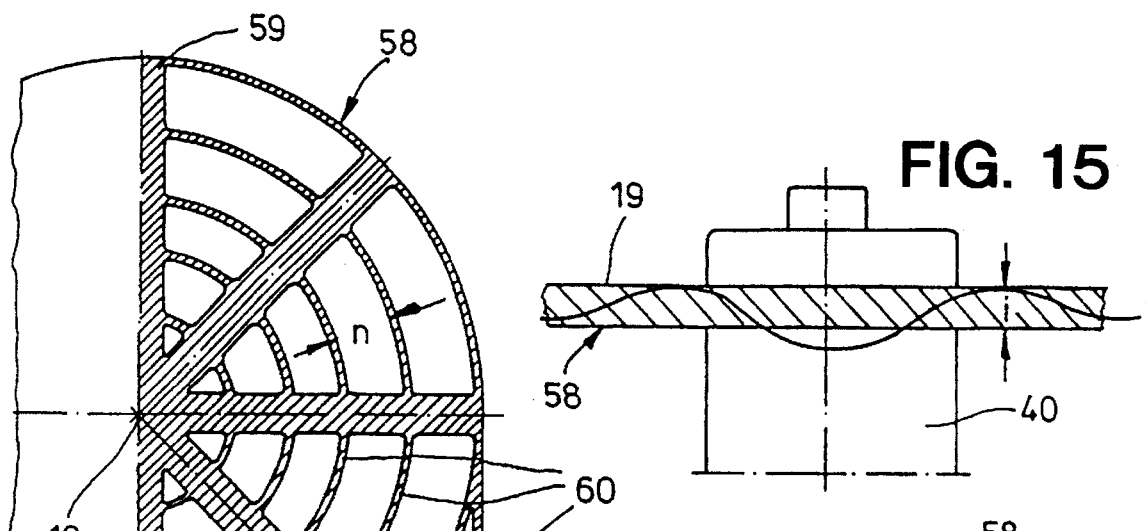
FIG. 15
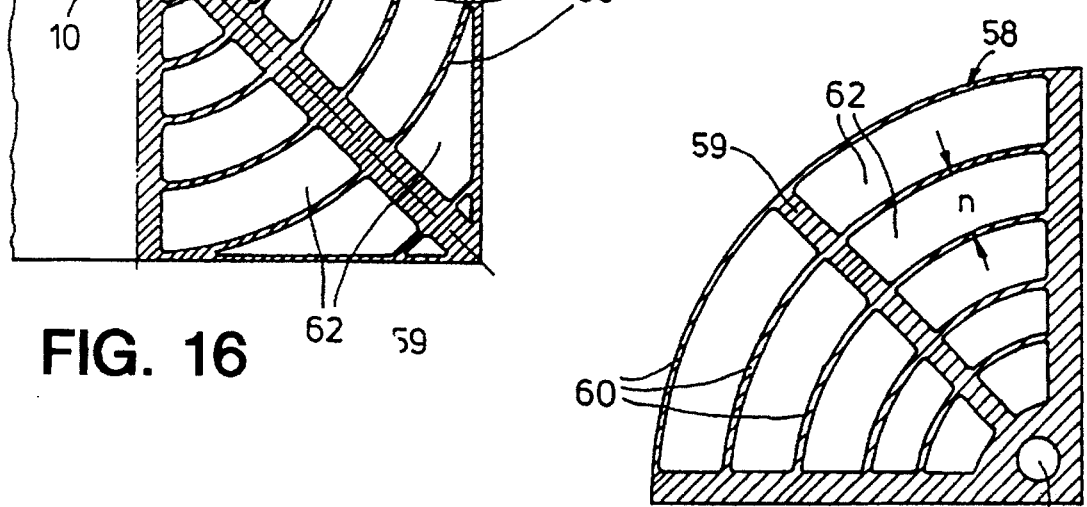
FIG. 16
FIG. 17

PROCESS AND DEVICE FOR SIFTING, SORTING, SCREENING, FILTERING OR SIZING SUBSTANCES

BACKGROUND OF THE INVENTION

The invention concerns an apparatus and a method of sieving, grading, sifting, filtering or sorting dry solid substances or solid substances in liquids.

It is known that the oscillating movements generated by ultrasound, particularly in sifting and fine sieving operations, exert an advantageous influence on the sieve throughput and the material being sieved; the material being sieved is treated carefully by the transmitted oscillating movements, in the micron range, the agglomeration forces and surface tensions are considerably reduced and the general tendency to clogging of the sieving machines decreases or is entirely eliminated.

EP 0 369 572 A2 discloses a sieving apparatus with a sieving surface which is clamped in a frame, and a piezoelectric transducer which is coupled to that surface. The transducer is a multi-part component and is clamped between two bodies of different masses, of which the one which is nearer to the sieving surface comprises two parts; one part is glued to the sieve while the other is interchangeable. Also described is a regulating circuit which is intended to keep the sieve mesh under load in a resonance condition, that however is thought not to be possible from a technical point of view.

The ultrasonic transducer is referred to as a composite transducer in the book 'Ultraschall' [Ultrasound] by Wilhelm Lehfeldt 1973, Vogel-Verlag, ISBN 3-8023-0060-2, page 40, and can be employed in all areas of active ultrasound uses such as for example ultrasound welding and ultrasound cleaning. Page 48 of that book mentions circuits with automatic frequency tracking or adaptation of the control circuit indicated in EP 0 369 572 A2.

All previously known methods suffer from the disadvantage that sound distribution over the entire active sieve mesh, which in most cases comprises a wire mesh, is very poor. The reason for that characteristic is that the sieve mesh, which is generally mounted tautly in a round or rectangular steel frame, cannot be excited in a resonance condition at the working frequency. The physical requirements for that purpose do not exist. The sieve mesh can serve only as a relatively poor ultrasound conductor. If in addition material to be sieved lies on the mesh, the resulting damping effect results in a further reduction in sound conductivity.

Those interrelations mean that after just a few centimeters in distance from the sound source, the level of intensity of the sound, and therewith also the conveyor effect, is greatly reduced.

In consideration of those factors the inventor set himself the aim of substantially eliminating those disadvantages by means of a suitable design configuration.

SUMMARY OF THE INVENTION

The invention seeks to provide that sieving and grading or screening operations as well as machines therefor are improved and sieving in the dry and wet areas by means of ultrasound are favored.

The invention further seeks to provide that resonators are so designed that the sieve is displaced with an undamped oscillating movement as far as possible over the entire surface area thereof.

That object is attained by the teachings of the present invention.

In accordance with the invention, associated with the ultrasound transducer is at least one resonator which bears against the sieve surface and which is tuned to the resonance of the ultrasound transducer and which can be caused thereby to oscillate, in particular with flexural oscillations.

In addition it has been found desirable for the resonator to be provided with resonance-transmitting elements which project finger-like from it on the sieve surface.

In other words the invention provides that no region on the active sieve surface is more than about 20 to 30 cm from the nearest ultrasound source. That is achieved with a system of resonator bars which operate in the flexural resonance mode and which are excited by a single ultrasound transducer. In relation to the round vibrating or shaking sieving machines which are frequently used, it is desirable for the ultrasound transducer to be moved into the center and for the resonator bars to be arranged radially around the ultrasound transducer. The transducer produces in known manner longitudinal oscillations which, in the resonator bars which are arranged tangentially relative to the longitudinal direction of oscillation, excite flexural oscillations at the same frequency. The oscillation amplitudes at 40 kHz are about 2 μm. The ultrasound output required is about 60 watts per square meter of sieve surface area.

As the resonator bars are excited at their natural resonance, the amplitude at each motion node is always the same irrespective of length and loading. With this method involving the use of a plurality of resonator bars, it is possible for the sound density and sound homogeneity on the sieve mesh to be varied as desired.

The sieve mesh can be in good contact with each resonator bar, by virtue of an adhesive means.

In accordance with a further feature of the invention the bar resonators are to terminate at a spacing relative to the frame. The entire star-shaped apparatus is preferably welded into the sieve frame by way of decoupling plates and together with the sieve frame forms a unit which is also mechanically highly stable.

The use of a plurality of resonator bars which are excited in the flexural mode by a single sound transducer makes it possible for no islands which are dead in respect of sound to occur on the sieve mesh. That means that the object set by the inventor is attained in an elegant manner. In that respect the resonator bars can be of different shapes. They may be bent, round or simply straight. Their cross-section is selected in consideration of physical laws which permit the excitation of the desired flexural oscillations in a preferential direction. They may comprise solid material or a hollow profile. For reasons of weight, a hollow profile is to be preferred.

Thus for example in a further configuration, at least one concentric annular bar resonator may extend in the circular frame, the bar resonator being connected to the frame by radial decoupling plates. The ultrasound transducer is disposed eccentrically here.

All the decoupling plates are preferably fixed in a node point of the motion zero point. It has been found desirable for an apertured plate or a coarse-mesh grid to be laid on the bar resonators.

In accordance with the invention, at least one fixing element is to extend between the ultrasound transducer and the resonator and the bar resonators which oscillate in a condition of flexural resonance with the ultrasound transducer are to be fixed to the fixing element, in which case further flexural oscillations can be generated and transmitted to the sieve surface.

In accordance with the invention the resonator is connected to the sieve frame in positively locking or force-locking relationship, directly or indirectly, at a location which exhibits the amplitude minimum; the sieve surface is to be supported by the ultrasound transducer with the resonator at at least one location.

It is also in accordance with the invention for the entire sieve apparatus to be capable of moving in all planes by means of one or more generic oscillation systems.

It is also possible for two sieves to be disposed one upon the other or to be connected to each other, in which case the coarser of the two sieves is used only for propagation and transmission of the oscillations. It is also possible to use special sieves which comprise different wire diameters.

It is possible with this sieving apparatus to produce operating conditions in which a pressure difference obtains between the upper and the lower sieve surfaces and/or the distribution of material on the sieve is effected by means of a gas or liquid jet.

In a particular embodiment the material to be sieved is distributed on the sieve by brushes and profile members of rubber, plastic material and metal and/or the material to be sieved is conveyed on to the sieve surface by means of a gas or liquid jet.

In addition it is possible to use bodies which lie on the sieve surface and which move freely with respect to the sieve surface.

In accordance with the teaching of the invention the distribution of ultrasound from the ultrasound transducer can be effected with frequency-tuned sound conduits or conducting means of metal.

It has been found advantageous for the ultrasound transducer to be hermetically sealed off and to be designed to be protected from explosion.

In accordance with the invention the working frequency is to be in the range of between 15 and 100 kHz.

It is of importance in regard to the invention that the system is frequency and amplitude modulated or however only frequency modulated or only amplitude modulated.

BRIEF DESCRIPTION OF THE DRAWINGS

Further advantages, features end details of the invention are apparent from the following description of preferred embodiments and with reference to the drawings in which:

FIG. 6 is a perspective view of an ultrasound flexural resonator with a part of a longitudinal resonator, FIG. 7 is a view in radial section through a part of FIG. 6 on an enlarged scale, FIG. 8 is a view in cross-section through an ultrasound transducer of a mushroom-like shape, FIG. 9 is a view in cross-section through an ultrasound resonator with radial bar resonators, FIG. 10 shows a modified detail from FIG. 9, FIG. 11 is a perspective view of the apparatus shown in FIG. 8, FIGS. 12 and 13 are views corresponding to FIG. 11 of further apparatuses, FIG. 14 is a perspective view of a further sieve, FIG. 15 is a view approximately corresponding to FIG. 3 of another transducer neck with a part of a clamped apertured plate, FIGS. 16 and 17 are plan views of parts of apertured plates.

DETAILED DESCRIPTION OF PREFERRED EMBODIMENTS

Figure 2:
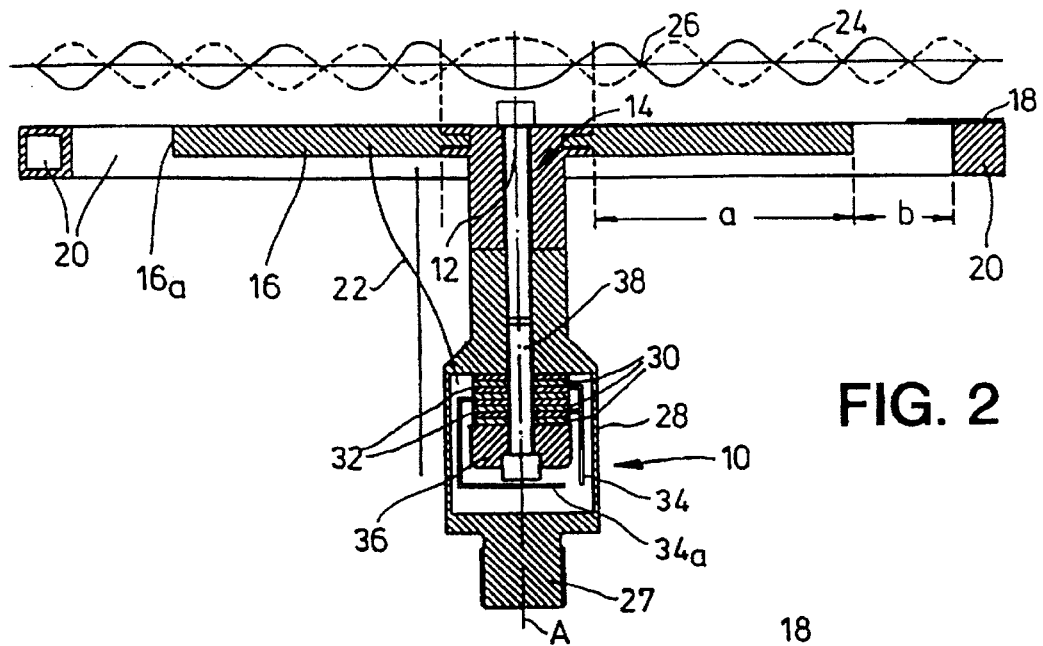
FIG. 2 is a view in cross-section through FIG. 1 taken along line II—II therein.
Figure 1:
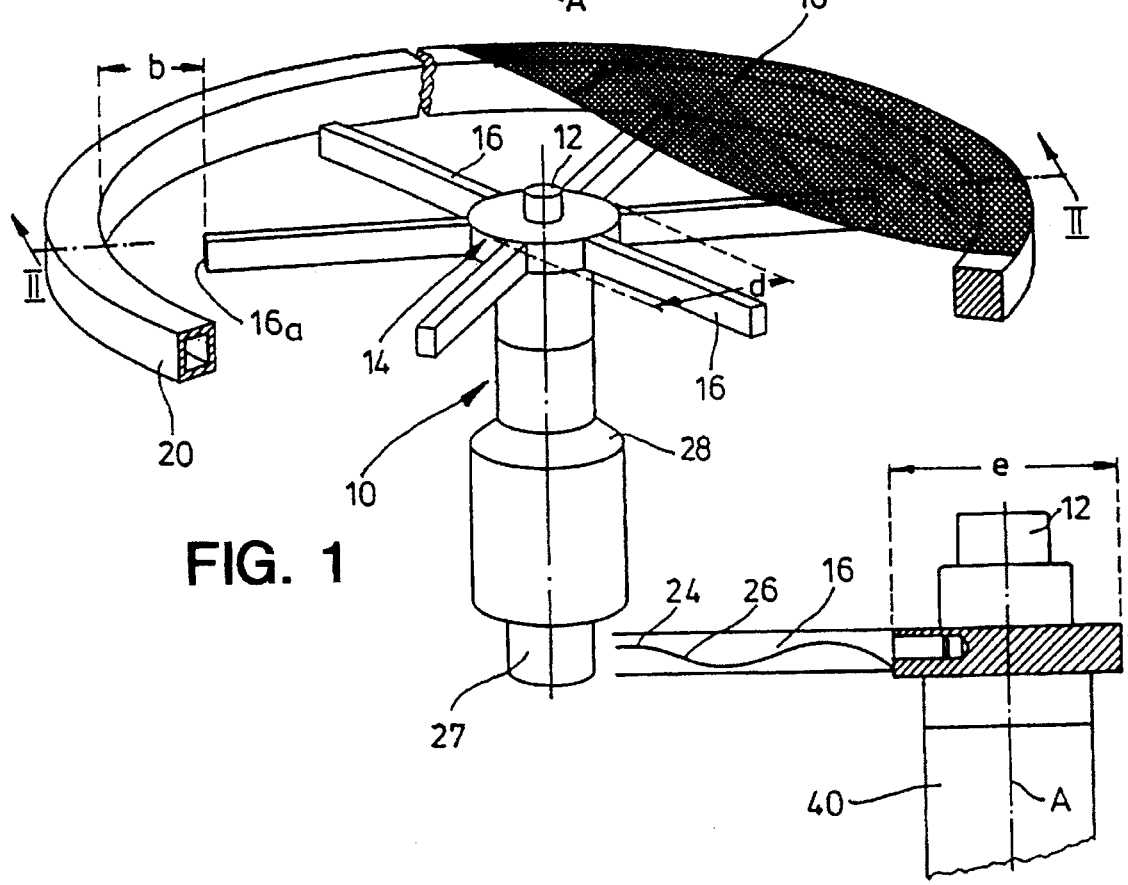
FIG. 1 is a sectional perspective view of a sieve which can be excited to perform an oscillating movement over its entire surface, with an ultrasound transducer and flexural wave bar resonators which are radial with respect thereto.

An ultrasound transducer or converter 10 as shown in FIGS. 1 and 2 oscillates in a state of longitudinal resonance with a flexural wave resonator comprising a flexural wave diaphragm resonator 14 arranged axially above the flexural wave resonator and mounted by a fixing element 12, and a plurality of flexural wave bar resonators 16. In that arrangement the ultrasound transducer 10 excites the flexural wave diaphragm resonator 14 of a diameter d, to produce flexural oscillations. The latter are transmitted to the flexural wave bar resonators 16 which project radially from the resonator 14 and which extend under a sieve surface or a sieve 18. The sieve 18 is clamped in an annular frame 20 which is hollow on the left in FIG. 1 and solid on the right in FIG. 1. The free ends $16_a$ of the flexural wave bar resonators 16 of a free length a terminate at a distance b from the frame 20.

FIG. 2 diagrammatically indicates by reference numeral 22 the configuration of the longitudinal waves while reference numeral 24 above the sieve 18 identifies the configuration of the amplitude of which one zero point occurs at 26.

PCT-rings 30 and beryllium-copper disks 32 with line connections 34, $34_a$ are disposed alternately in a sealed base housing 28 of the ultrasound resonator 10, the base housing 28 being disposed above a transducer support 27. A screwthreaded pin, a screw 38 or the like member which extends axially relative to the fixing element 12 passes through the rings 30 and the beryllium-copper disks 32, with a lower base plate 36, on the transducer axis A. The fixing element 12 passes through a transducer neck 40.

The apparatus therefore has a plurality of coupled oscillation systems which are turned to each other and which oscillate with each other at the same frequency. The diameter d of the diaphragm resonator 14 and the length a of the bar resonators 16 are of considerable significance and must be tuned to the operating frequency.

Figure 3:
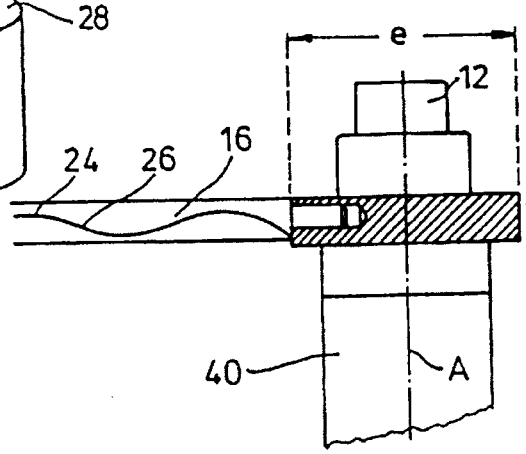
FIG. 3 is a side view of the fixing region of a radial flexural wave bar resonator on a transducer neck.

FIG. 3 shows the fixing region of the radial flexural wave bar resonators 16 of a cross-section of 8×8 mm on the transducer neck 40 of a head width e of 80 mm, with the illustrated oscillation curve whose nodes recur every 21 or 42 mm.

Figure 5:
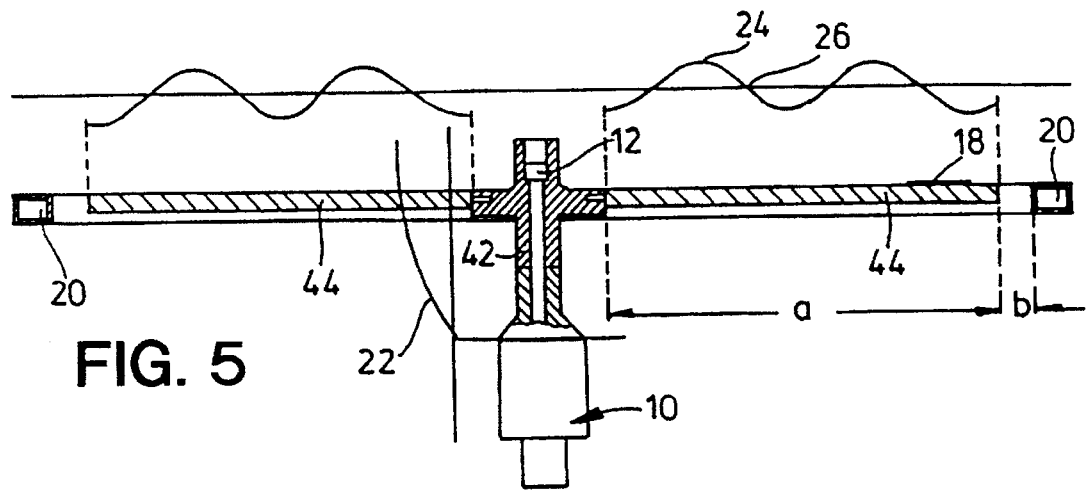
FIG. 5 is a view in cross-section through FIG. 4 taken along line V—V therein.
Figure 4:
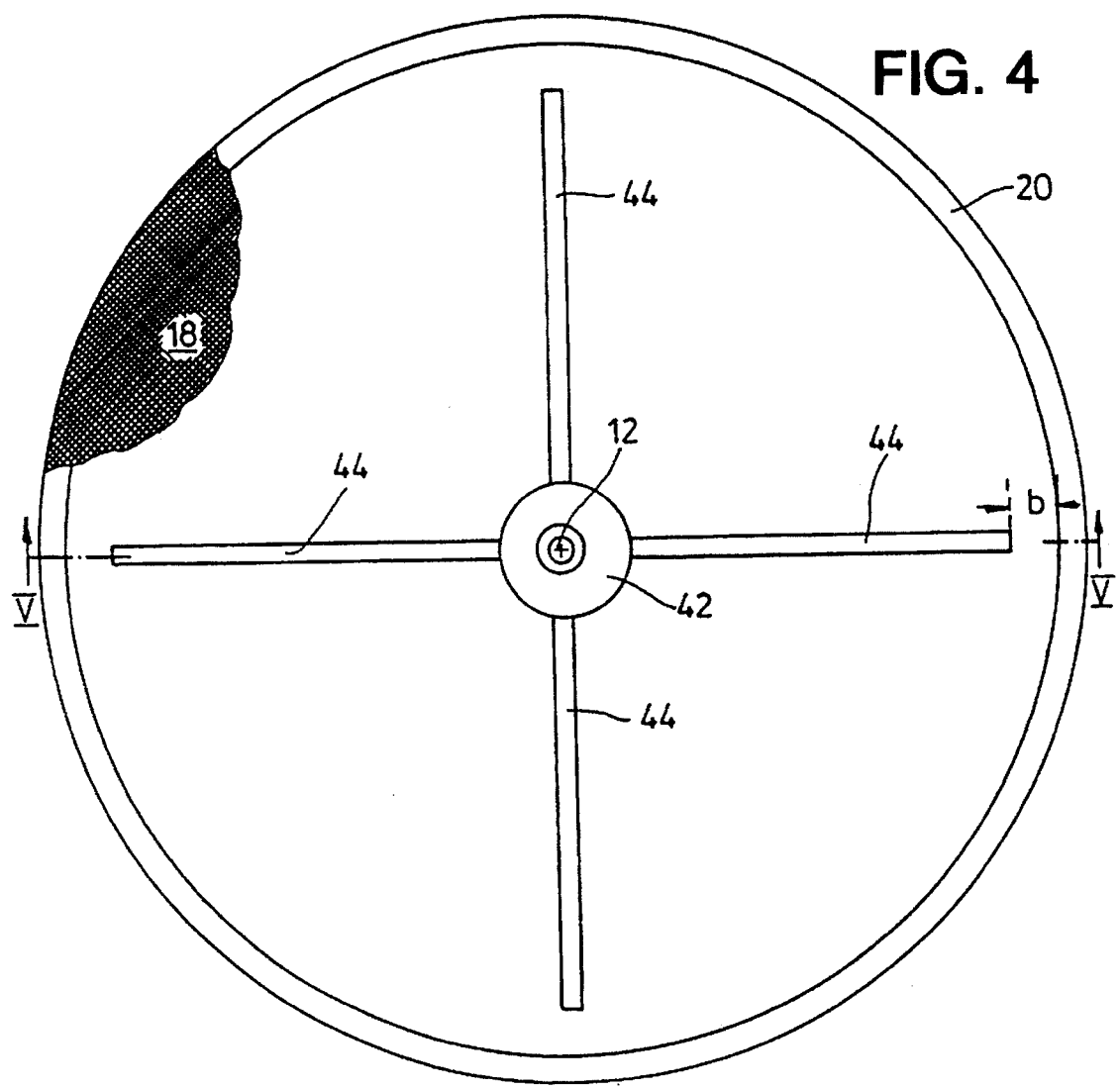
FIG. 4 is a plan view of another sieve with radial longitudinal wave bar resonators.

The ultrasound transducer 10 in FIGS. 4 and 5 oscillates in a condition of longitudinal resonance with a dilation wave resonator 42 which is fixed above it. Projecting radially from the resonator 42 are longitudinal wave bar resonators 44 which are excited in a condition of natural longitudinal resonance. In contrast to the flexural resonator, in the case of the longitudinal resonator the amplitude zero points 26 are much further apart, as is indicated by way of example above the sieve 18 in FIG. 5. That ultrasound transducer 10 is possibly integral with its dilation wave resonator 42.

As shown in FIGS. 6 and 7 the ultrasound transducer or converter 10 which can be connected in the middle or to the sieve frame corners of that longitudinal resonator system is crossed at a spacing f by at least one radial bar 46 of a height h of 10 mm, with a central connecting portion 47 of a, height h1 of 21 mm. Parallel transverse bars 48 of the rectangular cross-section described with reference to the bar resonators 16 of FIG. 5 extend from the radial bar 46 which, like the bar resonators 16, is made from a metal profile.

A mushroom-like configuration of an ultrasound transducer $10_a$ which converts longitudinal oscillations into diaphragm oscillations is in FIG. 8 sealingly welded in an explosion-protected manner to the base housing 28 which affords a sealing lateral passage means 29 In FIGS. 9 to 13 that ultrasound resonator $10_a$ with the plates for the lines 34, $34_a$ of two beryllium-copper disks 32 which are applied against PCT-rings 30, as a sandwich oscillator.

In FIGS. 9 to 13 that ultrasound resonator $10_a$ with the plates 30 of piezoceramic between the contact elements 32 is provided with from three to eight, preferably hollow flexural wave bar resonators 16 as flexural oscillators, the free ends $16_a$ thereof being connected by wing-like decoupling plates 50 to the frame 20. The axis-parallel connecting seam 51 thereof is disposed at a motion zero point. This is a particularly well-tuned resonator for sound distribution.

Shown on the frame cross-section at the right in FIG. 9 is a plug housing 52 with passage 53 which is fixed to a holder 54 beneath the frame 20. The passage 53 in FIG. 10 extends at the level of the hollow bar resonators 16, the interior of which is denoted by reference numeral 17 and is closed by an end cover 56.

The sieve in FIG. 14 has a sieve lining or covering comprising a coarser sieve 18 and a fine sieve 19.

Clamped in the transducer neck 40 in FIG. 15 is an apertured plate 58 which is preferably produced with a laser cutting machine and which is of a thickness i (of for example 8 mm in the case of aluminum and 12 mm in the case of steel) and on to which a fine sieve 19 is glued or held in another fashion. Here the apertured plate 58 used has radial ribs 59 and annular or arcuate ribs 60 which connect the ribs 59 and the mutual spacing n of which measures S/2. The apertured plate 59 can also involve different contours and openings 62. In the embodiment in FIG. 16 the ultrasound transducer 10 is disposed centrally while in FIG. 17 it is at a corner.

Figure 18:
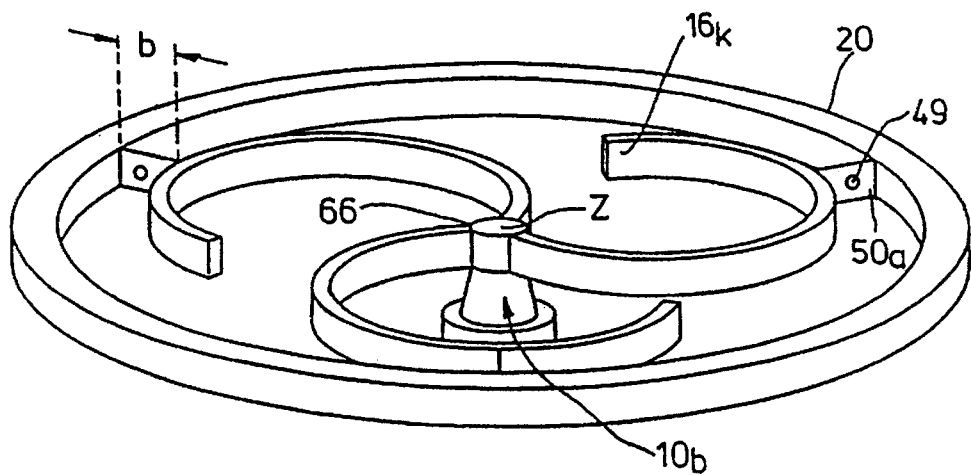
FIGS. 18 and 19 are perspective views of resonator heads.

The resonator head 66 of the ultrasound transducer $10_b$ in FIG. 18 has, within the frame 20 and at a radial spacing b therefrom, three approximately part-circular bar resonators $16_k$ which center Z and which, curved in the same direction, are fixed near their free ends to thin and substantially radially extending decoupling plates $50_a$. Arranged in each of the latter is at least one respective opening 49—such an opening 49 can also be provided in the decoupling plates 50 in FIGS. 11 through 14.

Figure 19:
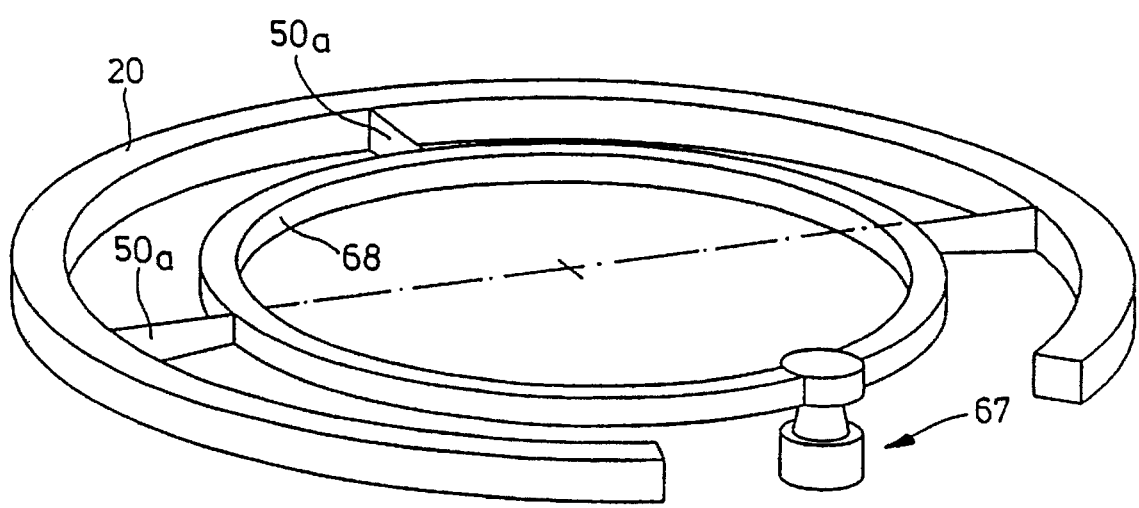

The resonator head 67 in FIG. 19 carries a circular bar 68 eccentrically within the frame 20 on the decoupling plates $50_a$.

Figure 20:
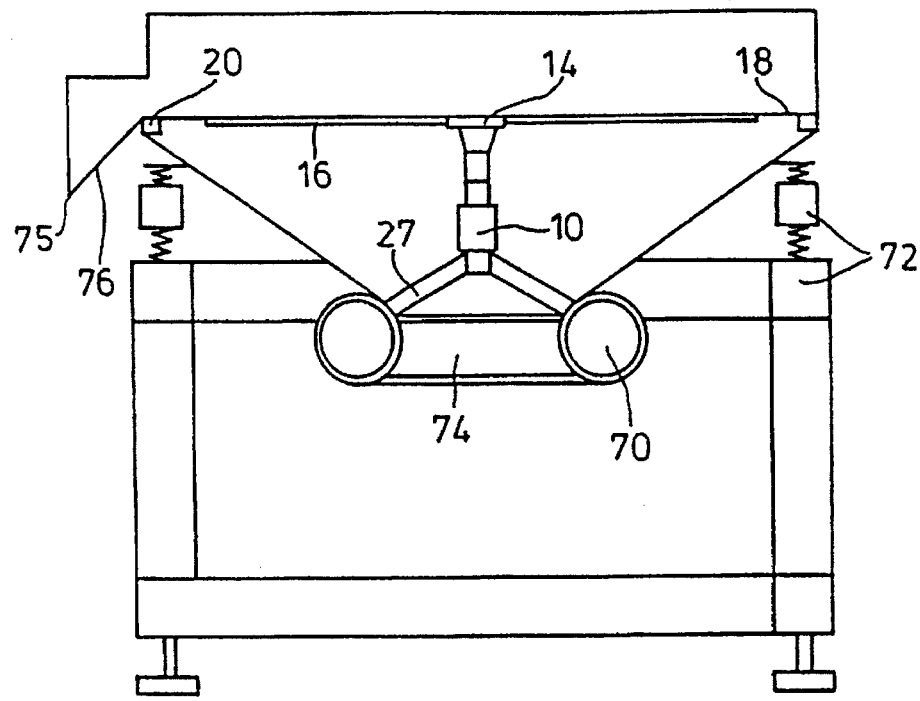
FIGS. 20 and 21 are views in section through different configurations of ultrasound transducers.

Advantageously the ultrasound sieve apparatus according to the invention can be fitted as an addition into an existing oscillating sieve machine 70 (FIG. 20). The ultrasound transducer 10 is positively lockingly or force-lockingly connected to the machine 70. The inertia forces caused by the mechanical oscillation system disposed at a higher level are carried by the ultrasound sieve apparatus and the fixing thereof and are not transmitted to the sieve 18 and the sieve frame 20. The sieve 18 is thus further supported, which is an aspect of significance in particular in the case of large fine-mesh sieve surfaces.

The ultrasound transducer 10 in FIG. 20 is installed with its flexural wave diaphragm resonator 14 in a round oscillating sieve machine 70 on oscillation shoes 72. The oscillating movements thereof provide for uniform distribution of the material 74 to be sieved on the sieve surface 18 and permit discharge of the coarse material 75 by way of an edge discharge 76.

Figure 21:
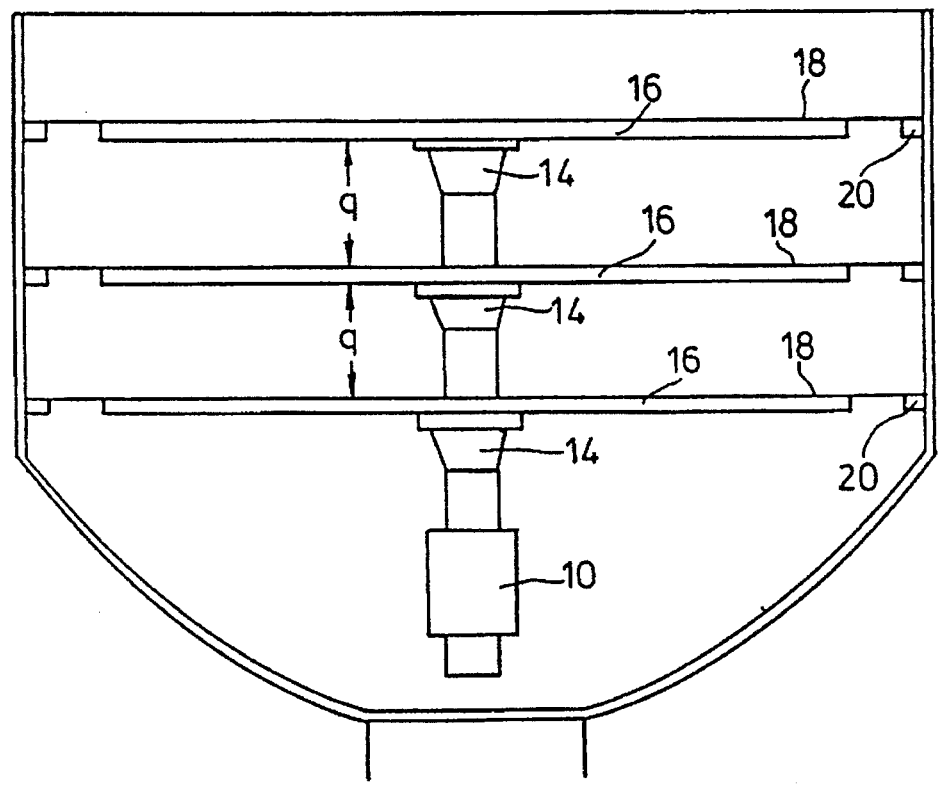

FIG. 21 shows that a plurality of flexural wave resonators 14 can also be excited by an ultrasound transducer 10, one above the other at a spacing q of S/2 which is adapted to the frequency.

Figure 22:
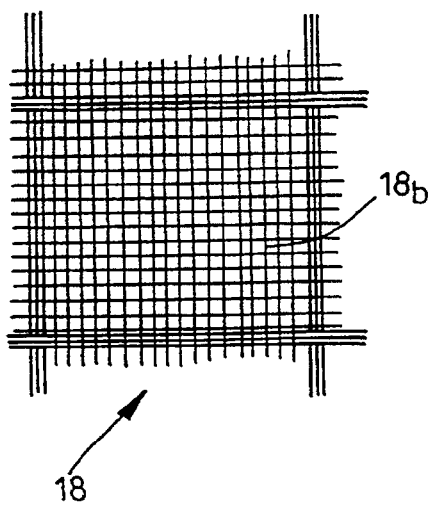
FIG. 22 shows a plan view of a sieve mesh.
Figure 23:
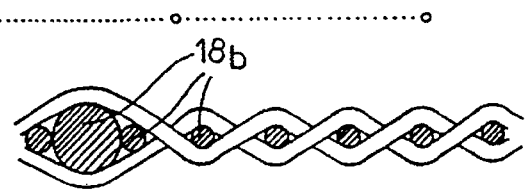
FIG. 23 shows views on an enlarged scale in cross-section through sieve meshes.

As shown in FIG. 22 and 23, the mesh wire $18_b$ is of different thicknesses, when using a special sieve mesh for the ultrasound sieving operation; by virtue of the thicker wires the ultrasound is spread over the entire sieve 18.

Figure 24:
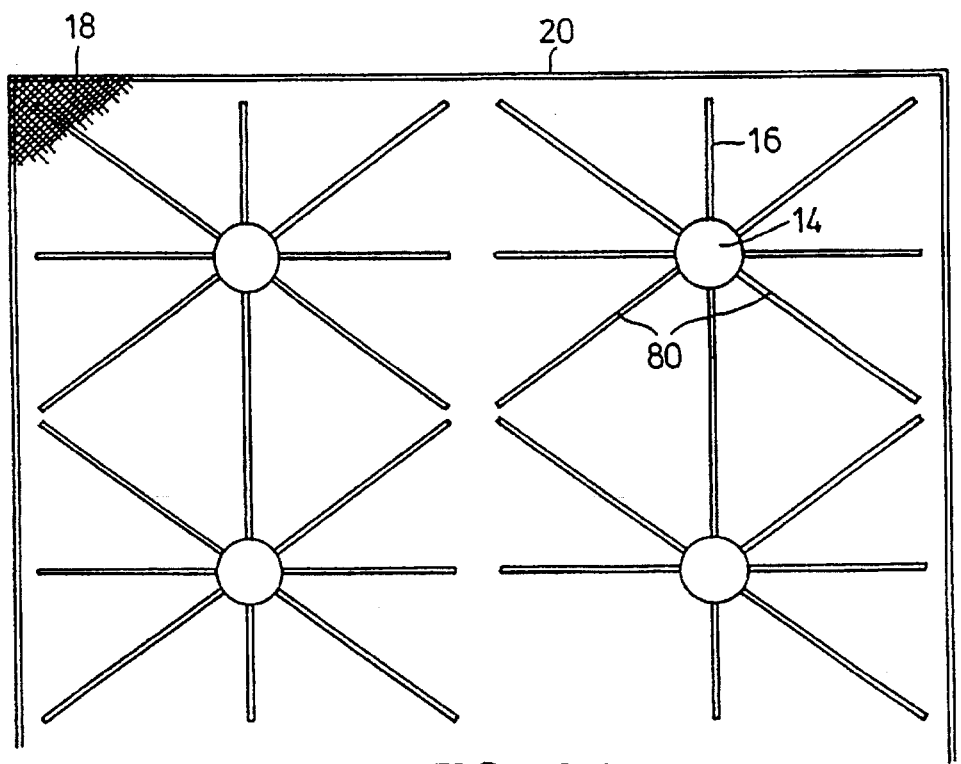
FIG. 24 is a plan view on to a converter having a plurality of resonators.

As shown in FIG. 24 ultrasound is transmitted with tuned sound conductors 80 of metal from a converter 10 to a plurality of resonators 14, 16 which are connected to a sieve. The ultrasound transducer 10 is in this case also therefore not directly connected to the resonator 14, 16.

Figure 25:
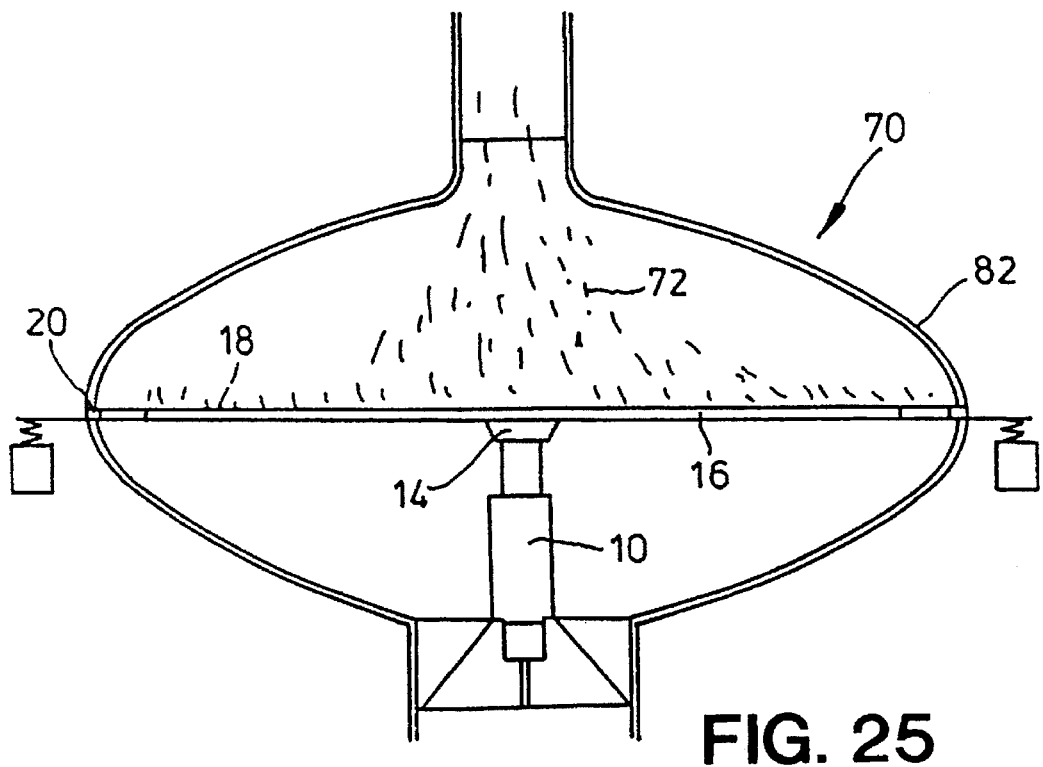
FIGS. 25 through 27 are views in section through different oscillating sieve machines.

The following Figures of the drawing show auxiliary means which promote the sieving operation with ultrasound. Thus FIG. 25 shows an oscillation sieve machine 70 with ultrasound sieve apparatus in which a pressure difference is produced between the upper and lower sieve surfaces in a vessel 82.

Figure 26:
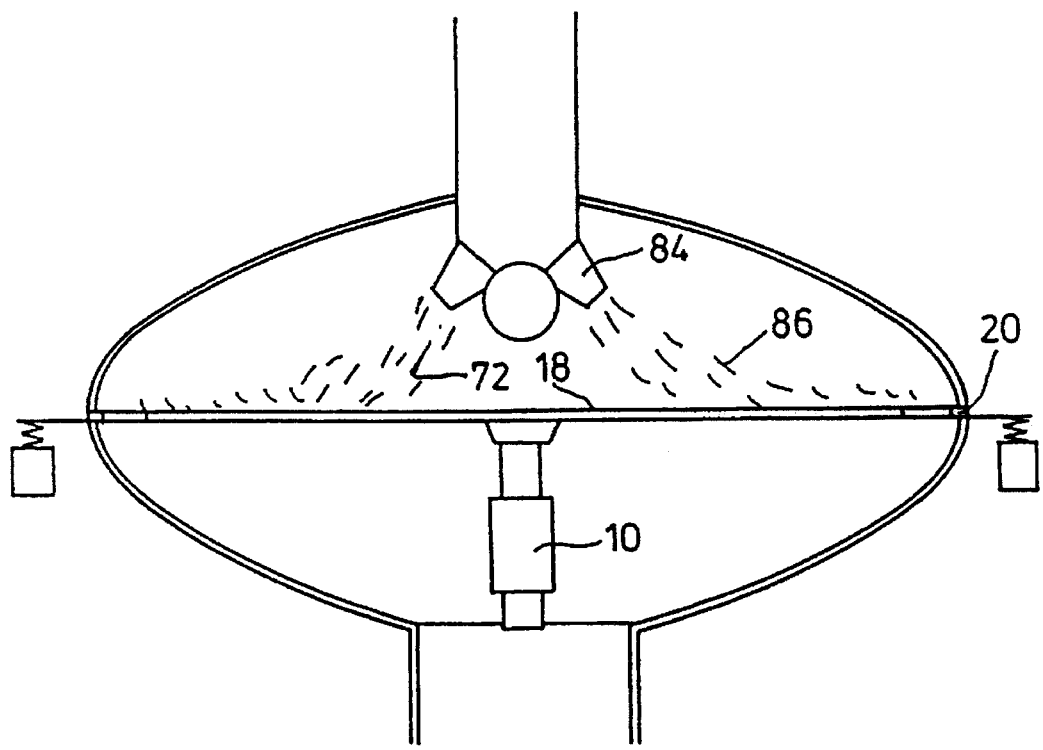

In FIG. 26 in an ultrasound sieve apparatus, the material 72 being sieved is shot on to the sieve surface 18 through nozzles 84 by means of an air jet 86, and that has a positive influence on the throughput in the sieving operation.

Figure 27:
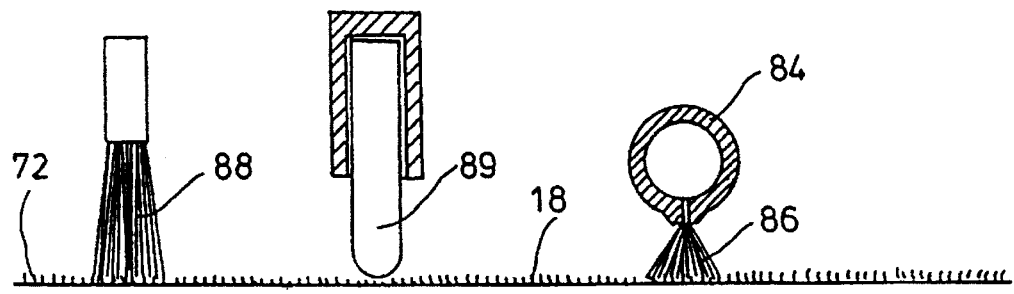

FIG. 27 shows an ultrasound sieve apparatus in which gas or liquid jets 86, brushes 88 and/or profile members 89 of rubber, plastic material and metal are used for the distribution of material on the sieve surface 18.

Figure 28:
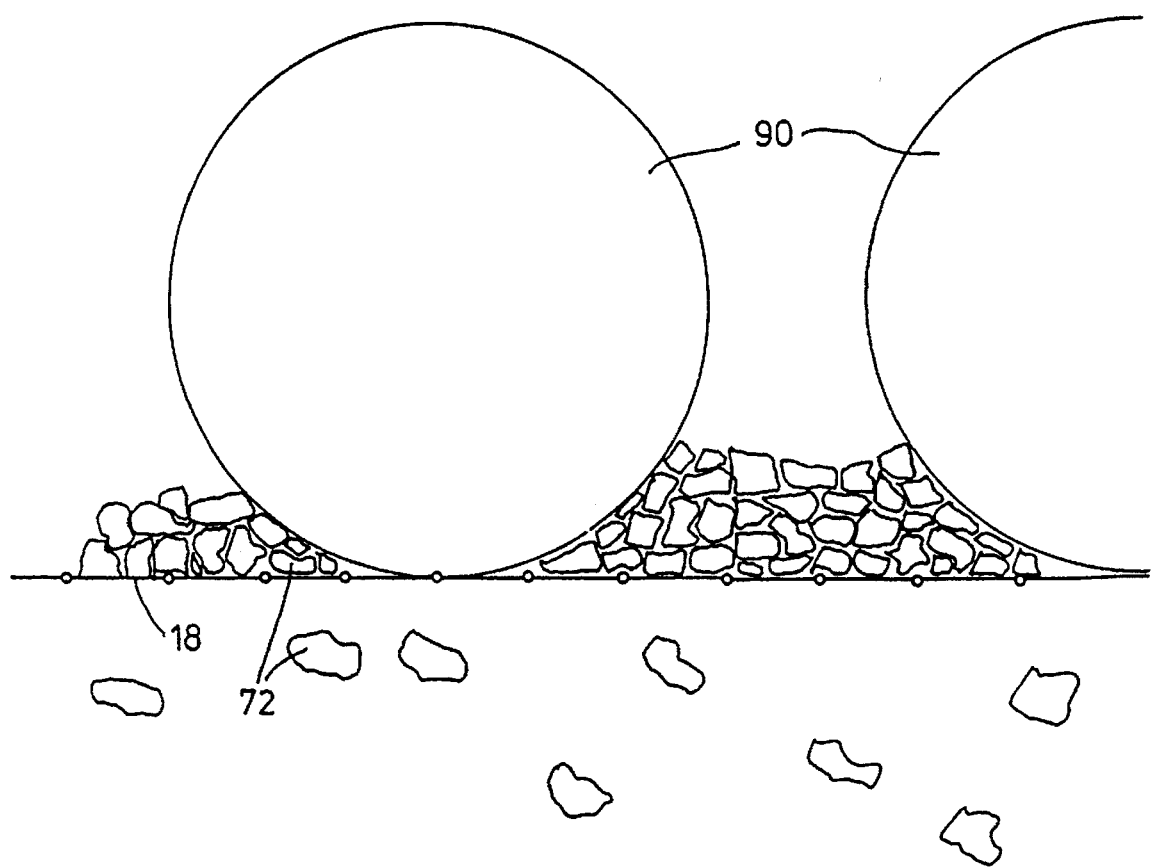
FIG. 28 is a plan view of an ultrasound sieve apparatus with different bodies on a sieve surface.

Finally, provided on the sieve 18 in FIG. 28 are spherical bodies 90 of metal or plastic material which are moved by ultrasound and urge the material 72 to be sieved, through the meshes.

We claim:

1. Apparatus for sieving, grading, sifting, filtering or sorting dry solid substances or solid substances in liquids, which comprises: a sieve surface; a sieve frame holding said sieve surface; an ultrasound transducer which is associated with the sieve surface and by which oscillations can be fed to the sieve surface; at least one resonator associated with the ultrasound transducer which bears against the sieve surface and which is tuned to the resonance of the ultrasound transducer and which can be caused to oscillate thereby; said resonator being provided with resonance-transmitting elements which are decoupled from the sieve frame.

2. Apparatus according to claim 1, wherein said ultrasound transducer can be caused to oscillate in a flexural oscillation mode.

3. Apparatus according to claim 1, wherein said resonance-transmitting elements project finger-like from the resonator.

4. Apparatus according to claim 3, wherein said resonance-transmitting elements are fixed to the sieve frame in a node point of the motion zero point.

5. Apparatus according to claim 1, wherein the resonator is disposed at the center of the sieve surface and the resonance-transmitting elements project radially from the resonator in the form of bar resonators.

6. Apparatus according to claim 5, wherein the bar resonators terminate at a spacing (b) from the frame.

7. Apparatus according to claim 5, wherein said bar resonators have free ends and said free ends are connected to the frame by decoupling means.

8. Apparatus according to claim 7, wherein the decoupling means are fixed in a node point of the motion zero point.

9. Apparatus according to claim 6, wherein said bar resonators are curved and wherein said curved bar resonators extend from the center and are disposed at a spacing relative to the frame by means of radial plates.

10. Apparatus according to claim 9, wherein the radial plates are fixed in a node point of the motion zero point.

11. Apparatus according to claim 1, including at least one concentric annular bar resonator which extends in the frame and is connected to the frame by radial plates.

12. Apparatus according to claim 11, wherein the radial plates are fixed in a node point of the motion zero point.

13. Apparatus according to claim 11, wherein the ultrasound transducer is mounted eccentrically.

14. Apparatus according to claim 5, including at least one fixing element which extends between the ultrasound transducer and the resonator, and clamped to the fixing element are the bar resonators which oscillate in longitudinal resonance with the ultrasound transducer, wherein further flexural or longitudinal oscillations can be produced and can be transmitted to the sieve surface.

15. Apparatus according to claim 1, which is movable in all planes by means of at least one superior oscillation system.

16. Apparatus according to claim 1, including a base housing of the ultrasound transducer which air-tightly closes off piezoceramic parts and contact elements which are associated with it.

17. Apparatus according to claim 1, including two sieve surfaces which lie one upon the other and which are of different mesh size, wherein the coarser of the two sieve surfaces is used for propagation and transmission of the oscillations.

18. Apparatus according to claim 17, wherein the two sieve surfaces are connected together.

19. Apparatus according to claim 1, wherein said sieve includes different wire diameters.

20. Apparatus according to claim 17, including a pressure difference between the upper and lower sieve surfaces.

21. Apparatus according to claim 1, including a gas or liquid jet of the sieve surface for the distribution of material or for conveying material to be sieved.

22. Apparatus according to claim 1, including at least one of brushes and profile members of a material selected from the group consisting of rubber, plastic and metal, which are distributed on the sieve surface for the distribution of material.

23. Apparatus according to claim 1, including bodies on the sieve surface which are freely movable relative thereto.

24. Apparatus according to claim 1, including sound conduit means of metal for frequency-tuned distribution of the ultrasound from the ultrasound transducer.

25. Apparatus according to claim 1, wherein the resonator is positively connected to the sieve frame at a location which has an amplitude minimum.

26. Apparatus according to claim 1, wherein the sieve surface is supported by the ultrasound transducer with the resonator at at least one location.

27. A method of sieving, grading, sifting, filtering or sorting dry solid substances or solid substances in liquids, which comprises: disposing a sieve surface in a sieve frame; providing an ultrasound transducer associated with the sieve frame and by which oscillations are fed to the sieve surface; wherein ultrasound is fed to the sieve surface from the ultrasound transducer by way of at least one resonator connected to the sieve surface and decoupled from the sieve frame; and providing that said ultrasound transducer is fixed outside the sieve surface and that said ultrasound is passed along the sieve surface radially with respect to the resonator.

28. A method as set forth in claim 27, including the step of providing said resonator with resonance-transmitting elements which are decoupled from the sieve frame.

29. A method as set forth in claim 28, including the step of projecting said resonance-transmitting elements finger-like from the resonator.

30. A method as set forth in claim 27, with an operating frequency in the range of 15–100 kHz.

31. A method as set forth in claim 30, including frequency modulation.

32. A method as set forth in claim 31, including amplitude modulation.

33. A method as set forth in claim 27, including frequency and amplitude modulation.

* * * * *